(12) United States Patent
Takai et al.

(10) Patent No.: US 7,544,880 B2
(45) Date of Patent: Jun. 9, 2009

(54) PLAYBACK MODE CONTROL DEVICE AND PLAYBACK MODE CONTROL METHOD

(75) Inventors: Motoyuki Takai, Tokyo (JP); Yoichiro Sako, Tokyo (JP); Toshiro Terauchi, Tokyo (JP); Makoto Inoue, Kanagawa (JP); Masamichi Asukai, Kanagawa (JP); Katsuya Shirai, Kanagawa (JP); Yasushi Miyajima, Kanagawa (JP); Kenichi Makino, Kanagawa (JP)

(73) Assignee: Sony Corporation (JP)

( * ) Notice: Subject to any disclaimer, the term of this patent is extended or adjusted under 35 U.S.C. 154(b) by 419 days.

(21) Appl. No.: 10/976,731

(22) Filed: Oct. 29, 2004

(65) Prior Publication Data
US 2005/0126370 A1 Jun. 16, 2005

(30) Foreign Application Priority Data
Nov. 20, 2003 (JP) ............................ P2003-391359

(51) Int. Cl.
*G10H 7/00* (2006.01)

(52) U.S. Cl. .......................................... 84/612; 84/636

(58) Field of Classification Search ................... 84/612, 84/636, 652, 658; 482/8, 9; 600/500, 502, 600/50
See application file for complete search history.

(56) References Cited

U.S. PATENT DOCUMENTS 5,137,501 A * 8/1992 Mertesdorf ................. 482/57
6,230,047 B1 5/2001 McHugh ..................... 600/519
6,493,652 B1 * 12/2002 Ohlenbusch et al. ........ 702/160
6,519,567 B1 2/2003 Fujii .......................... 704/503
6,672,991 B2 * 1/2004 O'Malley ..................... 482/8
7,183,480 B2 * 2/2007 Nishitani et al. ............ 84/615
2002/0040601 A1 4/2002 Fyre et al. .................... 73/490
2003/0171189 A1 * 9/2003 Kaufman ...................... 482/8
2005/0126370 A1 * 6/2005 Takai et al. .................. 84/636
2006/0107822 A1 * 5/2006 Bowen ........................ 84/612
2006/0112808 A1 * 6/2006 Kiiskinen et al. ............ 84/484
2006/0169125 A1 * 8/2006 Ashkenazi et al. ........... 84/612
2006/0281976 A1 * 12/2006 Juang et al. ................. 600/300
2007/0060446 A1 * 3/2007 Asukai et al. ................ 482/8
2007/0169614 A1 * 7/2007 Sasaki et al. ................. 84/612
2007/0203665 A1 * 8/2007 Darley et al. ............... 702/142
2007/0208531 A1 * 9/2007 Darley et al. ............... 702/142
2008/0051919 A1 * 2/2008 Sakai et al. .................. 700/94
2008/0236370 A1 * 10/2008 Sasaki et al. ................ 84/612

(Continued)

FOREIGN PATENT DOCUMENTS

JP 09-034456 2/1997

(Continued)

*Primary Examiner*—David S. Warren
(74) *Attorney, Agent, or Firm*—Lerner, David, Littenberg, Krumholz & Mentlik, LLP

(57) ABSTRACT

A replay mode control device in which the replay mode in reproducing music or video contents is controlled so as to be suitable for a user. A headphone of a mobile music reproducing device is provided with a vibration sensor for detecting movements of the user in the up-and-down direction. A walking movement detection unit detects the walking interval of the user based on an output of the vibration sensor. A replay mode controller manages control to adjust the replay rate of music contents to the walking interval of the user.

9 Claims, 8 Drawing Sheets

U.S. PATENT DOCUMENTS

2008/0257133 A1* 10/2008 Sasaki et al. .................. 84/604
2009/0019994 A1* 1/2009 McKinney .................. 84/612

FOREIGN PATENT DOCUMENTS

| JP | 2001-299080 | 10/2001 |
| JP | 2001-299980 | 10/2001 |
| JP | 2001-314385 | 11/2001 |
| JP | 2002-023742 | 1/2002 |
| JP | 2003-108154 | 4/2003 |
| JP | 2003-177749 | 6/2003 |
| JP | 02003177749 | * 6/2003 |
| WO | WO 03/005339 | 1/2003 |
| WO | WO 2004/072767 | 8/2004 |

* cited by examiner

US 7,544,880 B2

PLAYBACK MODE CONTROL DEVICE AND PLAYBACK MODE CONTROL METHOD

BACKGROUND OF THE INVENTION

1. Field of the Invention

This invention relates to a replay mode control device and a replay mode control method for controlling the replay mode in reproducing music or video contents. This invention also relates to a bio-information detection apparatus for outputting the bio-information, indicating the user's movements, to the replay mode control device.

This application claims priority of Japanese Patent Application No. 2003-391359, filed on Nov. 20, 2003, the entirety of which is incorporated by reference herein.

2. Description of Related Art

There has so far been known a device for varying an output of the music or the video responsive to the user's movements. For example, with a mobile phone device, disclosed in Patent Publication 1, a magnetic sensor for detecting vibrations is provided to a main body unit of the mobile phone. The tempo or the volume of the music may be varied by the user swinging the main body unit. With an audio control device, disclosed in Patent Publication 2, the center of gravity information is measured from the load information of the user and the acoustic effect is varied based on the center-of-gravity information.

Although the mobile phone device, disclosed in the Patent Publication 1, is convenient for quickening or slowing down the music number, as intended by a user, it is not possible with this mobile phone device to match the music to the user's unconscious body movements, or to vary the replay mode of the music at all times while the user is hearing the music.

On the other hand, the audio control device, disclosed in the Patent Publication 2, is applied to a technique presenting the sound generated in the virtual reality, in a stereophonic sound field, in order to indicate the user's position in the virtual reality, and is aimed to impart the meaning of the sound presented in a confined space comprehensively to the user.

There lacks up to now a device for presenting music or video suited to a user freely moving outdoors.

[Patent Publication 1] Japanese Laid Open Patent Publication 2003-108130

[Patent Publication 2] Patent Publication 2964897

SUMMARY OF THE INVENTION

It is an object of the present invention to provide a replay mode control device and a replay mode control method in which the replay mode of the video contents or music contents are varied in keeping with a user's movements.

In one aspect, the present invention provides a replay mode control device comprising a bio-information detection means for detecting bio-information of a user, a movement analysis means for analyzing movements of a user based on the bio-information, and a replay mode controlling means for controlling the replay mode for contents responsive to the movements of the user.

In another aspect, the present invention provides a method for controlling the replay mode comprising a bio-information detection step of detecting bio-information of a user, a movement analysis step of analyzing movements of a user based on the bio-information, a replay mode determining step of determining change of a contents replay mode based on the bio-information, and a reproducing step of reproducing contents with a replay mode determined by the replay mode determining step.

According to the present invention, in which the replay mode of the contents is controlled with the spontaneous movements of a user as the input information, the tempo or the rhythm is automatically changed, in keeping with body movements of a user, when the user walks as he/she listens to the music. This allows the user to enjoy highly variegated contents.

DESCRIPTION OF THE PREFERRED EMBODIMENTS

Figure 1:
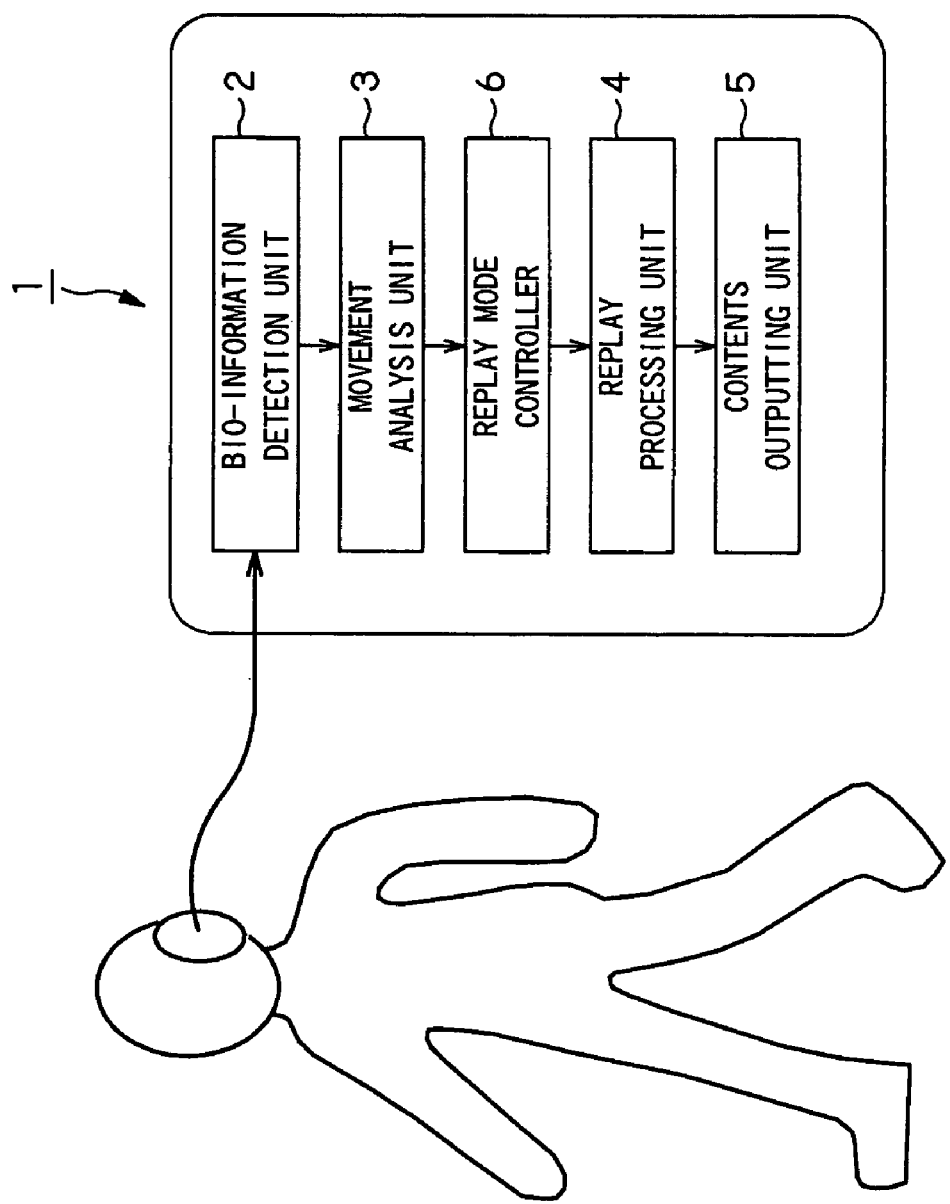
FIG. 1 is a block diagram showing the configuration of a contents reproducing device embodying the present invention.

The present invention is applied to a contents reproducing device 1 for reproducing music or image contents. Referring to FIG. 1, the contents reproducing device 1, embodying the present invention, includes a bio-information detection unit 2 for detecting the user's movements as the bio-information, a movement analysis unit 3 for analyzing e.g. the user's movements, based on the bio-information, a replay processing unit 4 for converting the contents into a replay signal, a contents outputting unit 5 for outputting the replay signal as sound or image, and a contents replay mode controller 6 for controlling the replay mode of the contents responsive to the user's movements.

The bio-information detection unit 2 detects the bio-information that is changed with life activities or movements of the user. The bio-information detection unit 2 may be exemplified by an acceleration sensor, a speed sensor, a pressure sensor, a pressure sensor, a body movement acceleration sensor, a gyro sensor and a position sensor. Although the bio-information detection unit 2 is shown in FIG. 1 as being integrally enclosed in the contents reproducing device 1, the two may be separated from each other and interconnected by a cable or via wireless communication.

The movement analysis unit 3 detects the user's movements or features based on the results of detection from the bio-information detection unit 2. For example, from an output of the speed sensor, it may be detected whether the user is walking or running. When the user is walking, more detailed movements, such as the walking pitch of the user (distance the user walks by one step), walking tempo (time needed per step), variations in the walking tempo, habit in walking, walking speed, rotational angular velocity, variations in the body, position or orientation, may be detected.

The replay mode controller 6 varies the replay mode of music contents based on the movement and the bio-information of the user. The replay mode controller 6 controls the replay speed of the contents, sound volume, beat sound, sound tone or display of titles of the contents.

The replay processing unit 4 converts the contents into replay signals, such as speech signals or image signals. The contents to be reproduced may be recording mediums, such as Compact Disc or Mini-Disc, or auxiliary recording devices, such as a hard disc drive (HDD). The contents to be reproduced may also be downloaded over a network from an external storage device. The contents to be reproduced may also be the digitized music information, such as musical instrument digital interface (MIDI) file. The replay processing unit 4 is able to change the replay mode of the replay signals, such as replay speed, replay sound volume, beat sound volume, sound tone, or titles of the music contents. The replay processing unit 4 changes an output in accordance with a command signal from the replay mode controller 6.

The contents outputting unit 5 outputs replay signals, generated by the replay processing unit 4, as sound or images. The contents outputting unit 5 may be a device for radiating the images or music to outside, such as a loudspeaker or a display, or a device mounted to about a user's ear or eye, such as a headphone or a head mount display, so that the image or the picture is output only to the user.

EXAMPLE 1

Figure 2:
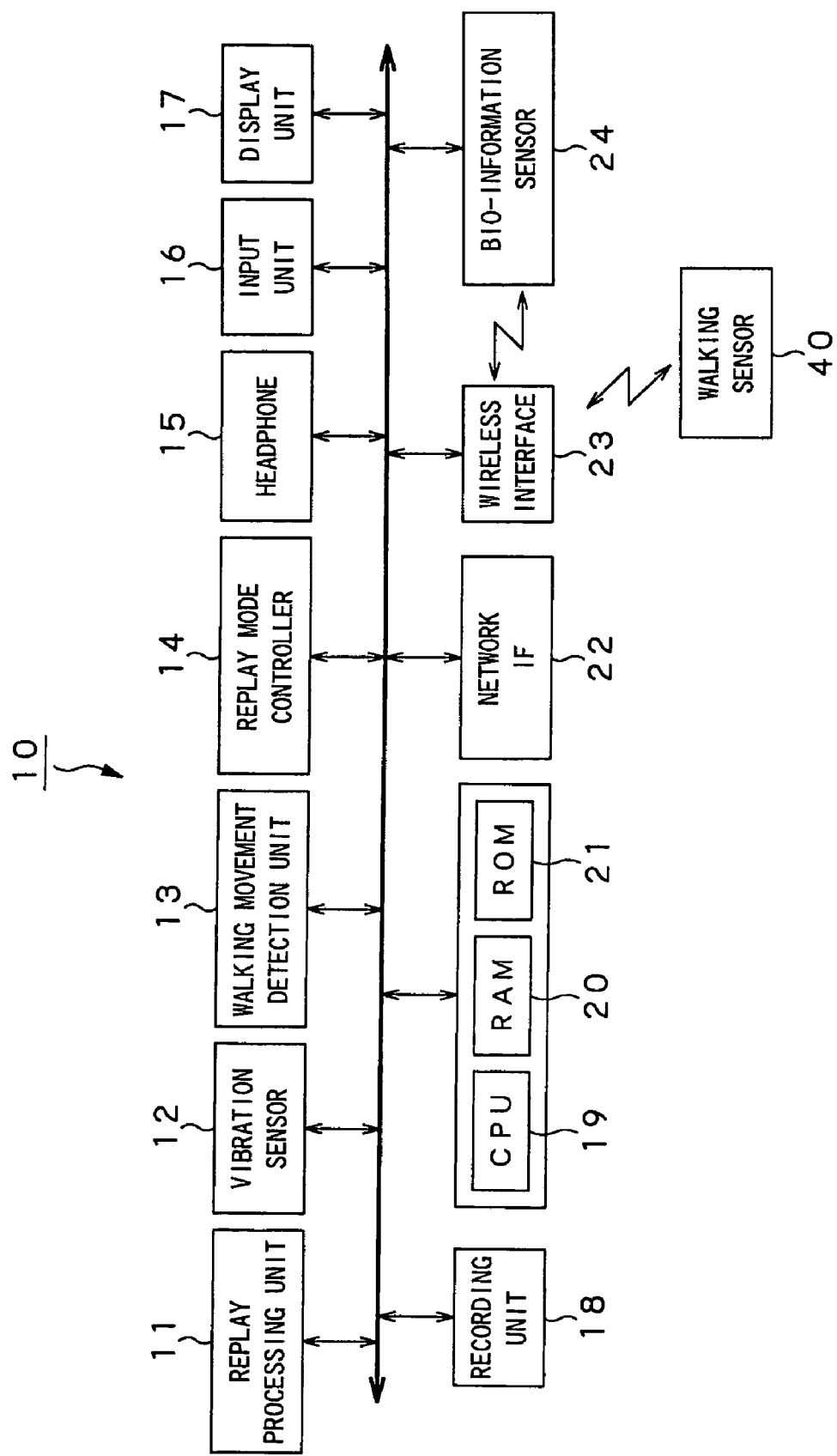
FIG. 2 is a block diagram showing the configuration of a music reproducing device embodying the present invention.

Referring to FIG. 2, a music replay device 10 for reproducing the music contents is explained. The music replay device 10 exercises control for matching the music contents replay speed to the user's walking tempo.

The music contents are acquired from a recording medium, such as the Compact Disc or Mini-Disc (registered trademark), an auxiliary recording medium, such as HDD (hard disc drive), or from a server on the network. The music replay device 10 may be carried about outdoors, with a battery enclosed therein. The music replay device 10 is provided with an output terminal for outputting music contents reproduced by a replay processing unit 11. The output terminal is provided with a headphone 15. The user privately enjoys the music output from the headphone 15. This headphone 15 is provided with a vibration sensor 12 for detecting vertical movement of the user as vibrations.

A walking movement detection unit 13 detects the user's walking tempo based on user's vertical movements. A replay mode controller 14 controls the user's walking tempo and the music replay speed.

Referring to FIG. 2, the music replay device 10 includes a replay processing unit 11 for converting music contents into replay signals, a vibration sensor 12 for detecting user's vertical movements as vibrations, a walking movement detection unit 13 for detecting the user's walking tempo based on an output of the vibration sensor 12, a replay mode controller 14 for controlling the replay mode of the music contents, responsive to the user's walking, a headphone 15, outputting music contents as sound, an input unit 16/output unit 17, as a user interface, a recording unit 18, as auxiliary recording means, a CPU (central processing unit) 19, controlling the music replay device 10 in its entirety, a RAM (random access memory) 20, as a work area for the CPU 19, and a ROM (read-only memory) 21, for storing the programs or the setting information. The music replay device 10 also includes a network interface 22 for connection to an external network, a wireless interface 23 for transmitting/receiving the information over a wireless path, and a bio-information sensor 24 for measuring the bio-information, excepting the user's vertical movements, such as heart rate or skin surface temperature.

Figure 3A:
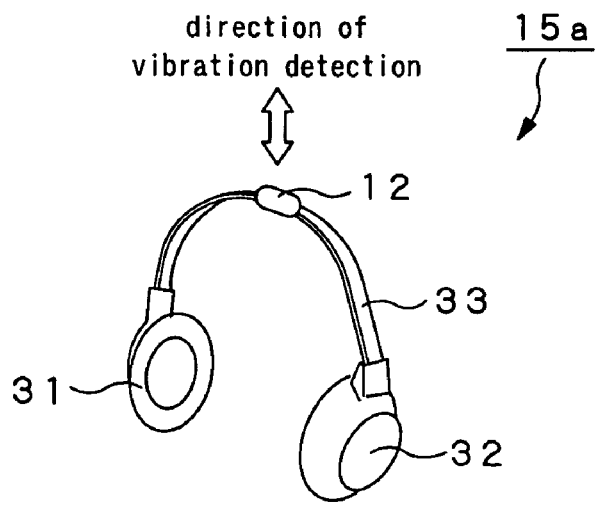
FIG. 3 shows an example of a mounting position for a vibration sensor.
Figure 3B:
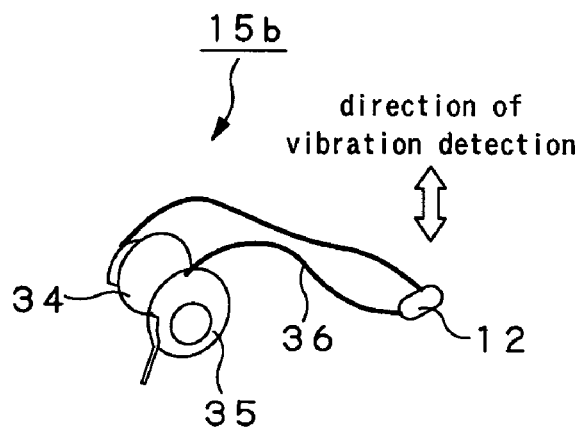
Figure 3C:
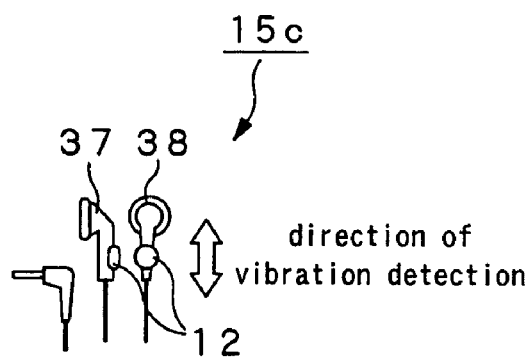

The vibration sensor 12 is mounted on headphones 15a to 15c on the music replay device 10. FIG. 3 shows a mounting example of the vibration sensor 12. FIG. 3a shows an overhead type headphone 15a. This overhead type headphone 15a is such a headphone in which a connecting part 33 interconnecting left and right loudspeakers 31, 32 is set on the user's scalp. In the overhead type headphone 15a, shown in FIG. 3a, the vibration sensor 12 is mounted at the center of the connecting part 33, that is, on the user's scalp. FIG. 3b shows a neckband type headphone 15b. The neckband type headphone 15b is such a headphone in which a connecting part 36 interconnecting left and right loudspeakers 34, 35 is set about the user's occipital zone. In the neckband type headphone 15b, shown in FIG. 3b, the vibration sensor 12 is mounted at the center of the connecting portion 36, that is, in rear of the occipital zone of the user. FIG. 3c shows an example of an inner ear type headphone 15c. This inner ear type headphone 15c is such a one in which a loudspeaker is inserted into the user's ear hole. In the inner ear type headphone 15c, shown in FIG. 3c, vibration sensors 12 are mounted in the left and right loudspeakers 37, 38.

Figure 4:
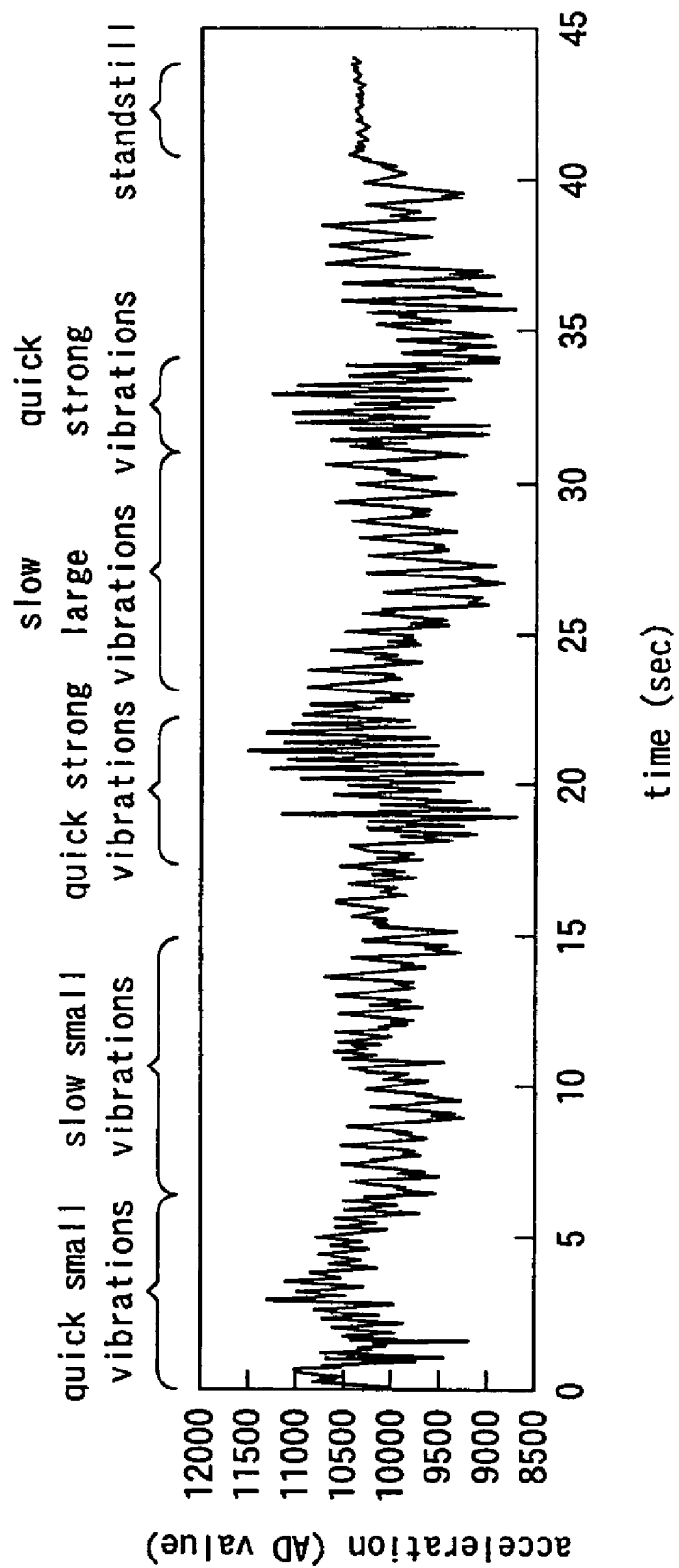
FIG. 4 shows an example of an output of a vibration sensor.

The vibration sensor 12 detects the vibrations along the vertical axis. FIG. 4 shows an output example of the vibration sensor 12 during walking. In FIG. 4, the abscissa and the ordinate denote time and acceleration, respectively. In FIG. 4, small quick vibrations are detected within an interval of 0 to 6 seconds as from the start of measurement. Within 6 to 15 seconds small slow vibrations are detected and, within 18 to 22 seconds, strong quick vibrations are detected. Within 23 to 32 seconds, large slow vibrations are detected and, within 32 to 34 seconds, strong quick vibrations are detected.

The walking movement detection unit 13 detects the user's walking tempo, based on the period of the vibrations, while detecting the strength of tramping, based on the amplitudes of vibrations, and detecting whether or not the user is walking, based on the waveform of the vibrations.

The replay mode controller 14 compares the user's usual walking tempo to the user's current walking tempo and quickening the replay speed of the music contents when the user's walking tempo is faster than the usual value, while slowing the replay speed of the music contents when the user's walking tempo is faster than the usual value. The usual walking tempo is calculated through learning.

Figure 5:
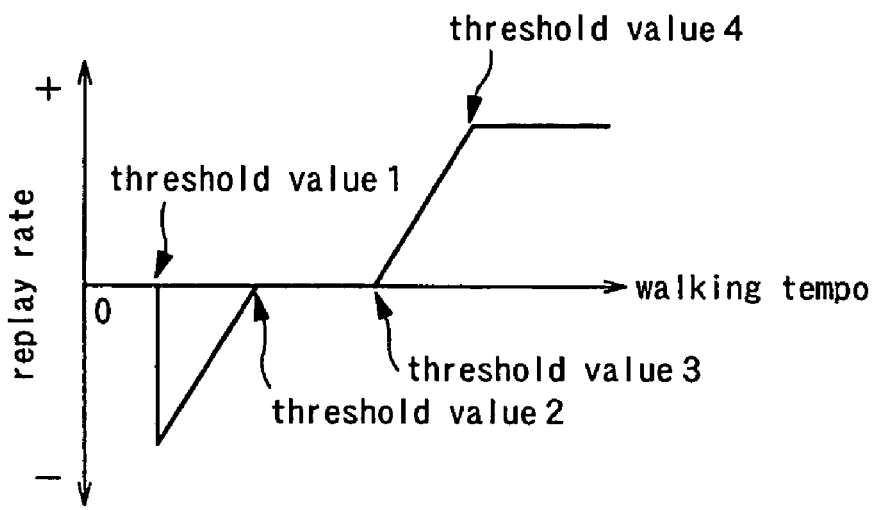
FIG. 5 shows an amount of variation of the reproducing speed of music contents relative to the user's stride.

FIG. 5 shows the amount of change of the replay speed relative to the current walking tempo. The abscissa and the ordinate of FIG. 5 denote the user's current walking tempo and the amount of change of the replay speed, respectively.

When the output of the walking movement detection unit 13 is from "0 to threshold value 1", the replay mode controller 14 does not change the replay speed for the music contents. The reason is that, if the output is from "0 to threshold value 1", the user is walking at an extremely slow rate or is at a standstill, and hence it is necessary to prevent music contents from ceasing to be reproduced properly as a result of matching the replay speed for the music contents to the user's walking tempo.

When the output of the walking movement detection unit 13 is intermediate between "the threshold values 1 and 2", the replay mode controller 14 deems that the user's walking tempo is slower than usual, and slows down the music replay rate than the actual rate in proportion to the lowering of the user's walking tempo.

When the output of the walking movement detection unit 13 is intermediate between "the threshold values 2 and 3", the replay mode controller 14 deems that the user is walking at a usual walking tempo, and keeps the music replay rate unchanged.

When the output of the walking movement detection unit 13 is intermediate between "the threshold values 3 and 4", the replay mode controller 14 deems that the user is walking at a tempo faster than the usual rate, and quickens the music replay rate in proportion to the user's walking tempo becoming faster.

When the output of the walking movement detection unit 13 exceeds "the threshold value 4", the replay mode controller 14 deems that the user is walking at a tempo appreciably faster than the usual walking tempo, and keeps the fastest music replay rate.

Figure 6:
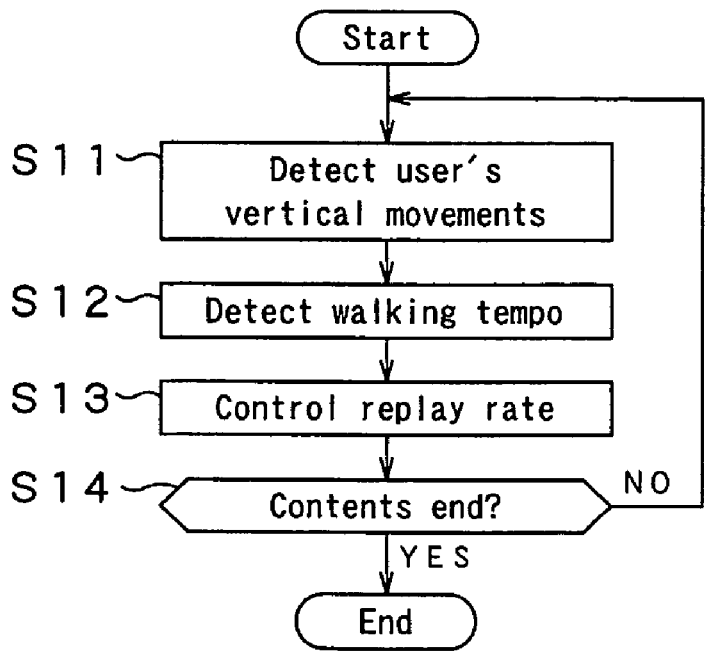
FIG. 6 is a flowchart showing the operation of a music replay device embodying the present invention.

Referring to the flowchart of FIG. 6, the operation of the music replay device 10 is explained. On receipt of a replay start command input from a user, the music replay device 10 commences to detect the user's walking tempo. In detecting the walking tempo, an acceleration sensor, mounted to a part of the user's body, detects the user's vertical movements (step S11). The walking movement detection unit 13 is supplied with the results detected by the acceleration sensor, and detects the user's walking tempo from the input vibration waveform.

The replay mode controller 14 compares the user's current walking tempo to the usual walking tempo and, if the current walking tempo is faster or slower than the usual walking tempo, the replay mode controller 14 raises or lowers the replay rate of the music contents, respectively (step S13).

EXAMPLE 2

Figure 7:
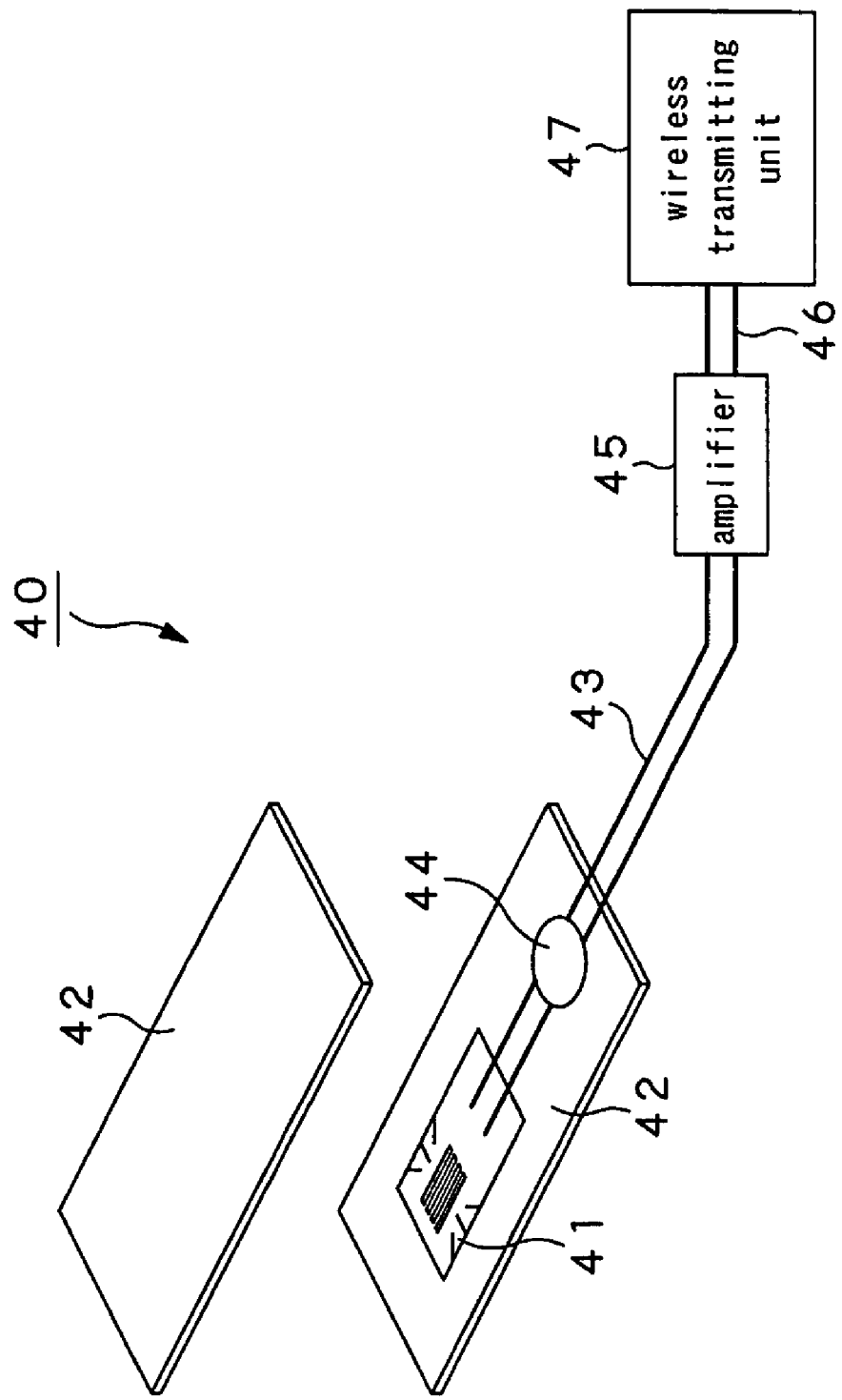
FIG. 7 shows an example of a walking sensor.

A walking sensor 40, shown in FIG. 7, may also be used in place of the acceleration sensor 12 in Example 1. The walking sensor 40 is a sensor detecting the touchdown of the user's foot on the floor or ground, and is mounted to a heel of the user's shoe. The walking sensor 40, used in FIG. 7, is a foil-shaped general-purpose strain gauge 41 and is mounted to a phosphor bronze plate 42. An output terminal 43 of the foil-shaped general-purpose strain gauge 41 is reinforced with a stiffener 44 and is extended in this state to outside the phosphor bronze plate 42. The output terminal 43 of the foil-shaped general-purpose strain gauge 41 is connected to an amplifier 45, an output terminal 46 of which is connected to a wireless transmitting unit 47. This wireless transmitting unit 47 transmits an output of the foil-shaped general-purpose strain gauge 41 to the wireless interface 23 of the music replay device 10.

Figures 8A, 8B:
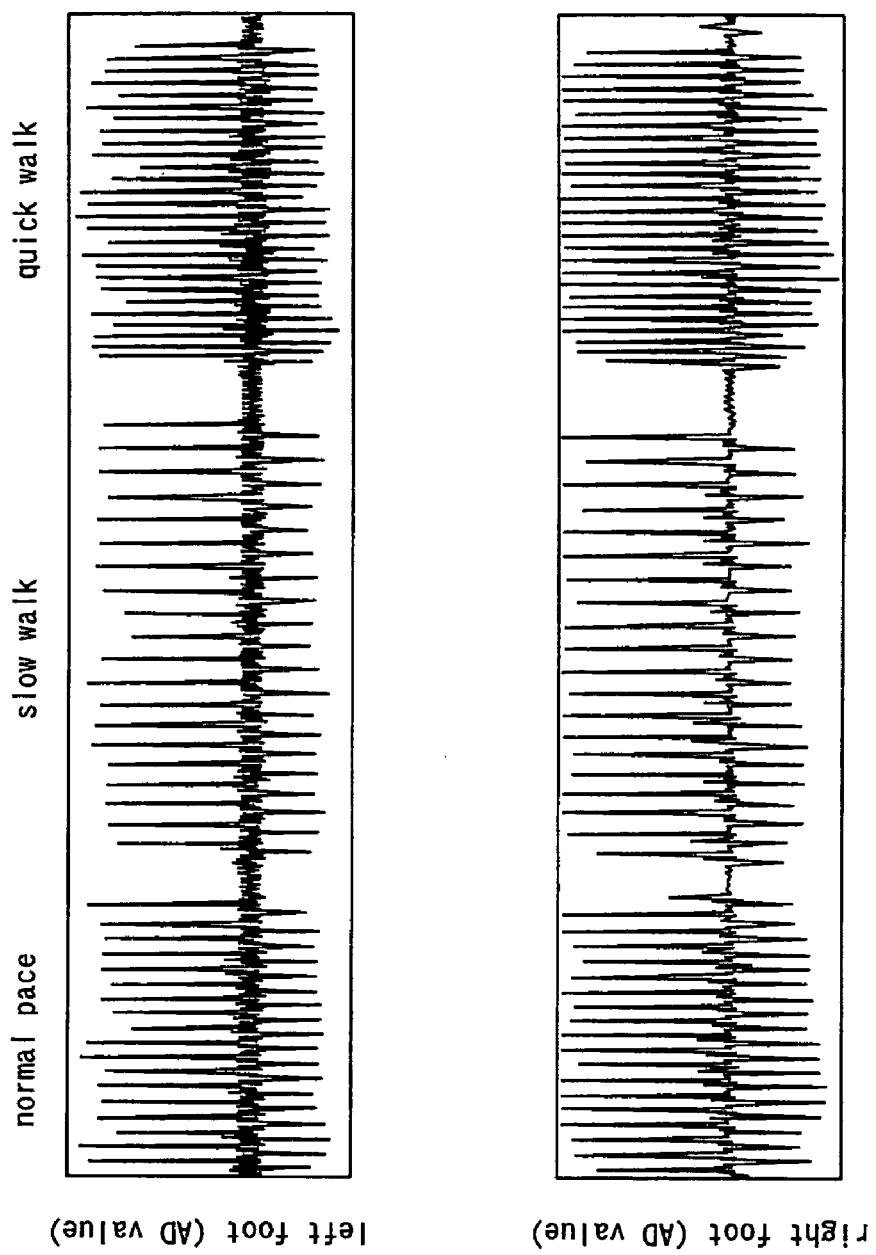
FIG. 8 shows an example of an output of a walking sensor.

FIG. 8 shows exemplary outputs of the walking sensor 40. In this example, an output when the user walks with a usual walking tempo, an output when the user walks with a slow walking tempo and an output when the user walks with a quicker walking tempo, are shown. The output of the walking sensor 40 becomes maximum and minimum when the user's foot contacts the floor or ground and when the user's foot has cleared the floor or ground, respectively. The walking sensor 40 may be mounted on each of the left and right feet or may be mounted on only one foot, in which case the interval equal to one half the touchdown interval (stride) is used as the walking tempo. FIGS. 8(*a*) and 8(*b*) show an output of the walking sensor 40 mounted on the sole of the shoe of the right foot and an output of the walking sensor 40 mounted on the sole of the shoe of the left foot, respectively. The user's walking tempo is the time interval as from the time one of the user's feet contacts the floor or ground until the other foot touches the floor or ground, that is, the time interval as from the time the value of the walking sensor 40 has become maximum until the value of the walking sensor 40 has become maximum.

As sensors for detecting the user's movements, there is a sensor employing a microphone, in addition to the walking sensor 40. There has so far been known a means for detecting user's vibrations based on a microphone output. Thus, a microphone may be mounted to the main body unit of the music replay device 10, the user's apparel, or to the timepiece, to detect the user's movements. The mobile phone is provided with a microphone, which may be used for detecting that the user has moved.

EXAMPLE 3

Figure 9:
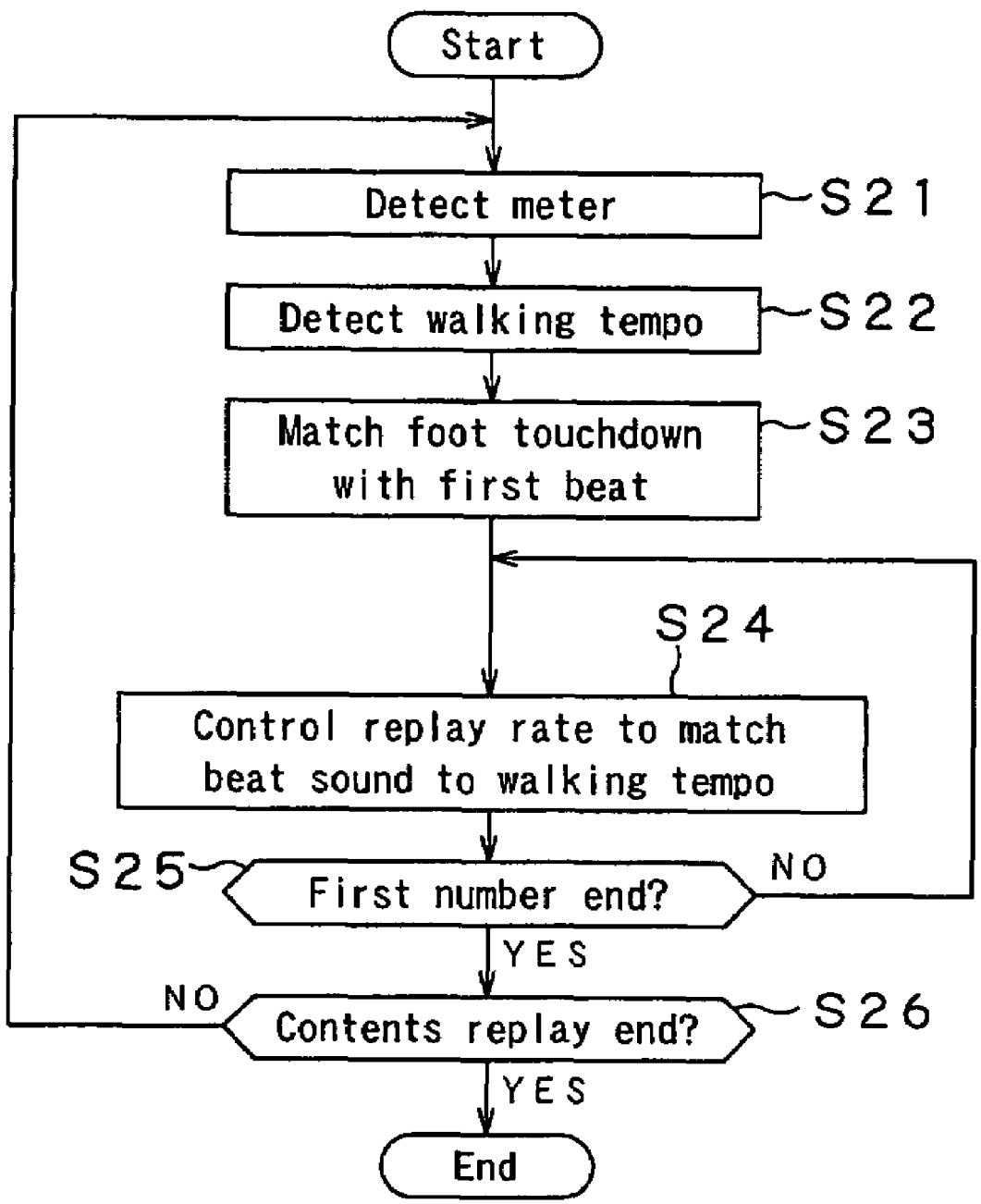
FIG. 9 is a flowchart showing the operation of a replay mode control unit in synchronizing the instant of contact of the user's foot on the floor and the beat sound.

The music replay device 10 is able not only to change the replay speed but also to synchronize the user's touchdown timing with the beat of the music. FIG. 9 shows the operation of the replay mode controller 14 when the instant when the user's foot has contacted the floor or ground is synchronized with the beat.

When music replay start is commanded, the replay mode controller 14 detects the meter of music contents and the user's walking tempo. In detecting the meter, the characteristic frequency of the base or the snare may be detected from the frequency distribution of the replay signal or the generation interval of the low-pitch sound may be detected (step S21). The walking tempo may be detected on the basis of the user's vertical movements or from an output of the walking sensor, as described above (step S22).

Based on the user's walking tempo, the replay mode controller 14 outputs so that the best will be synchronized with the instant the user's foot touches the floor or ground (step S23). The replay mode controller 14 subsequently controls the replay rate of the music contents so that the user's walking tempo is synchronized with the beat sound (step S24).

When the music replay has come to a close until the end of a music number, the replay mode controller 14 (step S25; YES), the replay mode controller 14 proceeds to the processing of a step S21 to detect the meter of the next music number. If the replay has not reached the end of a music number (step S25; NO), the replay mode controller 14 shifts the processing to a step S24 to control the replay rate of the music contents.

When the music replay has come to a close until the end of the music contents (step S26; YES), the replay mode controller 14 terminates the control of the replay rate. When the music replay has not come to a close until the end of the music contents (step S26; NO), the replay mode controller 14 shifts the processing to a step S21 to detect the meter of the next music number.

The control of synchronizing the touchdown of the user's foot with the beat of the music may be applied to dancing exercises. In the dancing, one may take rhythm with the vertical body movements or do dance steps in timed relation to the sound. Hence, the beat interval is changed in keeping with the vertical movements of the user's body or the sound of the meter is reproduced simultaneously with stepout. Hence, the user may learn which swing may be used for which sound and the sound matching for dancing.

EXAMPLE 4

The music replay device 10 is able to change the music replay mode based on the physiological changes in a user. The music replay device 10 is provided with a bio-information sensor 24 for detecting the bio-information of the user. The bio-information sensor 24 detects the bio-information, such as the pulse, skin sweating, skin resistance, myogenic potential or body surface temperature of the user. The bio-information sensor is mounted to an article worn by the user, such as a wrist band, wrist watch, apparel, shoe or clothes.

The replay mode controller 14 changes the replay mode of the music contents in keeping with the bio-information of the user. Among changes in the replay mode, there are changes in the replay rate, in the replay sound volume, in the beat sound volume, changes in the contents reproduced, and in the sound tone.

What is claimed is:

1. A replay control device comprising
bio-information detection means for detecting a walking pitch and a walking tempo of a user;
movement analysis means for analyzing a stepping tempo of the user based on said walking pitch and walking tempo;
content storage means configured to store and readout a plurality of content data;
replay controlling means for controlling selection among said plurality of content data in response to said stepping tempo; and
reproducing means configured to reproduce content data selected by said replay controlling means at a reproduction rate;
when the walking tempo of the user is between a first predetermined threshold and a second predetermined threshold the reproduction rate of the content data is lower than the nominal reproduction rate, when the walking tempo of the user is above a third predetermined threshold the reproduction rate of the content data is higher than the nominal reproduction rate, and when the walking tempo of the user is lower than the first predetermined threshold, or between the second predetermined threshold and the third predetermined threshold, the reproduction rate is equal to the nominal reproduction rate.

2. The replay control device according to claim 1 wherein said replay controlling means further controls at least one of sound volume, beat sound, sound tone or title indication.

3. The replay control device according to claim 1 wherein said bio-information detection means is mounted on the user's body.

4. The replay control device according to claim 1 wherein said bio-information includes acceleration or velocity of movement in an up-and-down direction of the user.

5. The replay control device according to claim 1 wherein said bio-information detection means comprises a pressure sensor provided in a bottom of a shoe of the user;
said movement analysis means detecting a touching down of the bottom of the shoe of the user or a separation of the bottom of the shoe of the user from a surface.

6. A method for controlling a replay of recorded contents, the method comprising:
a bio-information detection step of detecting a walking pitch and a walking tempo of a user;
a movement analysis step of analyzing a stepping tempo of the user based on said walking pitch and walking tempo;
a replay controlling step of controlling selection among a plurality of content data in response to said stepping tempo; and
a reproducing step of reproducing content data selected in said replay controlling step at a reproduction rate;
whereby when the walking tempo of the user is between a first predetermined threshold and a second predetermined threshold the reproduction rate of the content data is lower than the nominal reproduction rate, when the walking tempo of the user is above a third predetermined threshold the reproduction rate of the content data is higher than the nominal reproduction rate, and when the walking tempo of the user is lower than the first predetermined threshold, or between the second predetermined threshold and the third predetermined threshold, the reproduction rate is equal to the nominal reproduction rate.

7. The method for controlling replay according to claim 6 wherein
said replay controlling step further controls at least one of sound volume, beat sound, sound tone or title indication.

8. The method for controlling replay according to claim 6 wherein
said bio-information is an acceleration or velocity in an up-and-down direction of the user during walking.

9. The method for controlling replay according to claim 6 wherein
said bio-information detection step detects a touching down of a bottom of a shoe of the user on a surface or a separation of the bottom of the shoe of the user from the surface; and wherein
said movement analysis step detects a stepping tempo of the user based on the detection(s) of said bio-information detection step.

* * * * *